United States Patent
Palmer et al.

(10) Patent No.: US 12,338,765 B2
(45) Date of Patent: Jun. 24, 2025

(54) POWER GENERATION AND STORAGE

(71) Applicant: ROLLS-ROYCE plc, London (GB)

(72) Inventors: Chloe J Palmer, Derby (GB); Peter Swann, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 18/715,858

(22) PCT Filed: Nov. 16, 2022

(86) PCT No.: PCT/EP2022/082055
§ 371 (c)(1),
(2) Date: Jun. 3, 2024

(87) PCT Pub. No.: WO2023/104451
PCT Pub. Date: Jun. 15, 2023

(65) Prior Publication Data
US 2025/0043715 A1    Feb. 6, 2025

(30) Foreign Application Priority Data
Dec. 9, 2021    (GB) ...................................... 2117755

(51) Int. Cl.
*F02B 63/04* (2006.01)
*F01N 3/02* (2006.01)
(Continued)

(52) U.S. Cl.
CPC .......... *F02B 63/042* (2013.01); *F01N 3/0205* (2013.01); *F01N 3/08* (2013.01); *F02B 29/045* (2013.01)

(58) Field of Classification Search
CPC .... F02B 63/042; F02B 29/045; F01N 3/0205; F01N 3/08
See application file for complete search history.

(56) References Cited

U.S. PATENT DOCUMENTS 7,043,920 B2 * 5/2006 Viteri ................... F25J 3/04533
60/683
2015/0184590 A1    7/2015 Conlon
(Continued)

FOREIGN PATENT DOCUMENTS

CN    113315152 A    8/2021
WO    2015/105670 A1    7/2015
(Continued)

OTHER PUBLICATIONS

Feb. 23, 2023 International Search Report issued in International Patent Application No. PCT/EP2022/082055.
(Continued)

*Primary Examiner* — Shafiq Mian
(74) *Attorney, Agent, or Firm* — Oliff PLC

(57) ABSTRACT

A combined cycle power generation and storage system is shown. A liquid air energy storage system uses excess power to liquefy air and stores it in a liquid state. A combustion engine produces power by combustion of a carbon-based fuel along with an exhaust stream containing carbon dioxide. A heat recovery system exchanges heat from the exhaust stream to air from the liquid air storage system, and thereby produce a cooled exhaust stream and heated air. An air expansion machine recovers power by expansion of heated air from the heat recovery system. A separation system separates carbon dioxide from ambient air prior to liquefaction during operation of the liquid air energy storage system, and separates carbon dioxide from the cooled exhaust stream during operation of the combustion engine prior to emission of the cooled exhaust stream to atmosphere.

19 Claims, 6 Drawing Sheets

(51) Int. Cl.
  *F01N 3/08* (2006.01)
  *F02B 29/04* (2006.01)

(56) References Cited

U.S. PATENT DOCUMENTS

| | | |
|---|---|---|
| 2015/0226094 A1 | 8/2015 | Alekseev |
| 2017/0016577 A1 | 1/2017 | Sinatov et al. |
| 2018/0221807 A1* | 8/2018 | Sinatov .................. F25J 1/0242 |
| 2019/0063685 A1* | 2/2019 | Sinatov .................. F25J 1/0251 |

FOREIGN PATENT DOCUMENTS

| | | |
|---|---|---|
| WO | 2015/123613 A1 | 8/2015 |
| WO | 2018/128803 A1 | 7/2018 |

OTHER PUBLICATIONS

May 9, 2022 Search Report issued in British Patent Application No. 2117755.5.
Oct. 14, 2022 Search Report issued in British Patent Application No. 2117755.5.

* cited by examiner

POWER GENERATION AND STORAGE

CROSS-REFERENCE TO RELATED APPLICATIONS

This specification is based upon and claims the benefit of priority from United Kingdom patent application GB2111489.7 filed on Aug. 10, 2021, the entire contents of which is incorporated herein by reference.

BACKGROUND

Field of the Disclosure

This disclosure relates to power generation and storage systems and methods of operation relating thereto.

Description of the Related Art

Liquid air energy storage (LEAS) is a known implementation of cryogenic energy storage, in which energy—usually in the form of surplus electricity—is used to cool air to the point where it liquefies. The liquefied air is then stored until a later point—typically when demand for electricity is high—whereupon the liquid air may be heated to a gas and expanded to recover energy. Waste process heat may be used to improve overall efficiency.

SUMMARY OF THE DISCLOSURE

In an aspect, there is provided a combined cycle power generation and storage system comprising:
  a liquid air energy storage system configured to use excess power to liquefy air and store it in a liquid state;
  a combustion engine configured to produce power by combustion of a carbon-based fuel along with an exhaust stream containing carbon dioxide;
  a heat recovery system configured to exchange heat from the exhaust stream to air from the liquid air storage system, and thereby produce a cooled exhaust stream and heated air;
  an air expansion machine configured to recover power by expansion of heated air from the heat recovery system;
  a separation system configured to separate carbon dioxide from ambient air prior to liquefaction during operation of the liquid air energy storage system, and to separate carbon dioxide from the cooled exhaust stream during operation of the combustion engine prior to emission of the cooled exhaust stream to atmosphere.

In an embodiment, the system further comprises a first electrical generator coupled to the combustion engine to produce electrical power.

In an embodiment, the system further comprises a second electrical generator coupled to the air expansion machine to produce electrical power.

In an embodiment, one or more of the first electrical generator and the second electrical generator is coupled to an electrical grid.

In an embodiment, the excess power is excess electrical power from an electrical grid.

In an embodiment, the air expansion machine is configured to expand the heated air and exhaust it to atmosphere.

In an embodiment, the separation system comprises a reverse Brayton cycle cooler configured to further cool the cooled exhaust stream or ambient air to liquefy carbon dioxide therein, and to thereby produce a further-cooled gas stream, and a separation unit configured to separate carbon dioxide entrained in the further-cooled gas stream, and thereby produce an output gas stream having a reduced concentration of carbon dioxide.

In an embodiment, the separation unit is a flash separation unit.

In an embodiment, the reverse Brayton cycle cooler comprises, in fluid-flow series, a compressor configured to compress a working fluid, a heat exchanger configured to reject heat from the working fluid to a heatsink, and an expander configured to expand, and thereby further cool, the working fluid.

In an embodiment, the compressor is a multi-stage compressor.

In an embodiment, the reverse Brayton cycle cooler further comprises an intercooler between stages of the multi-stage compressor, the intercooler being configured to reject heat from the working fluid to a heatsink.

In an embodiment, the heatsink of the intercooler is the output exhaust stream from the separation unit.

In an embodiment, the intercooler forms part of the heat recovery system, and the heatsink of the intercooler is air from the liquid air storage system.

In an embodiment, the system further comprising a second expander configured to expand the output exhaust stream.

In an embodiment, the combustion engine comprises an intercooled compression system configured to reject heat to air in the heat recovery system.

In an embodiment, the combustion engine comprises one of a gas turbine engine and a reciprocating engine.

In another aspect, there is provided a method of operating a combined cycle power generation and storage system the method comprising:
  storing excess power using a liquid air energy storage system by separating carbon dioxide from ambient air, liquefying the air, and storing the air in a liquid state;
  producing power by combustion of a carbon-based fuel in a combustion engine, along with an exhaust stream containing carbon dioxide;
  exchanging heat from the exhaust stream to air from the liquid air storage system, thereby producing a cooled exhaust stream and heated air;
  recovering power by expansion of the heated air;
  separating carbon dioxide from the cooled exhaust stream;
  wherein carbon dioxide is separated from the air and from the cooled exhaust stream using the same separation system.

In an embodiment, the excess power is received from an electrical grid. In an embodiment, the power produced by combustion of carbon-based fuel is exported to the electrical grid.

In an embodiment, the carbon dioxide is separated by cooling the cooled exhaust stream or ambient air as the case may be using a reverse Brayton cycle.

In an embodiment, the reverse Brayton cycle performs, in sequence, compression, heat rejection, and expansion processes upon the cooled exhaust or ambient air as the case may be.

In an embodiment, the reverse Brayton cycle expands the cooled exhaust stream or the ambient air as the case may be to a pressure and temperature above the triple point of carbon dioxide such that said carbon dioxide remains in a liquid state.

BRIEF DESCRIPTION OF THE DRAWINGS

Embodiments will now be described by way of example only with reference to the accompanying drawings, which are purely schematic and not to scale, and in which.

DETAILED DESCRIPTION

FIG. 1

Figure 1:
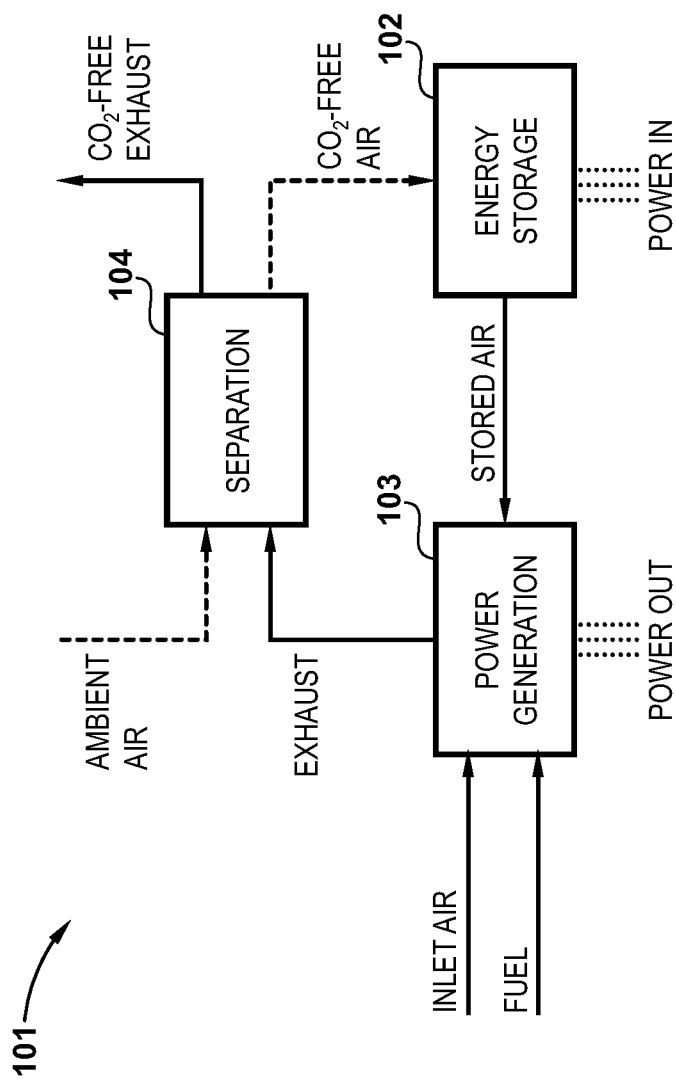
FIG. 1 shows a power generation and storage system.

A power generation and storage system 101 is illustrated in FIG. 1. In the embodiment described herein, the power generation and storage system 101 is configured to generate power and store energy, possibly in a cyclical manner. In the Figure, the route of working fluids during power generation is shown with solid arrows, whilst the route of working fluids during energy storage is shown with dashed arrows.

In the illustrated embodiment, the power generation and storage system 101 comprises an energy storage subsystem 102 which is configured to liquefy ambient air using excess power during an energy storage process, and stores the air in a liquid state. The power generation and storage system 101 further comprises a power generation subsystem 103 which is configured to produce power using a combination of combustion of a fuel in the presence of air, and power recovery from the stored air. Hence, the power generation subsystem 103 operates as a combined cycle power generation system. In the present embodiment the fuel is a carbon-based fuel and thus the exhaust from the power generation subsystem 103 contains a concentration of carbon dioxide greater than ambient air.

The power generation and storage system 101 further comprises a separation subsystem 104 which, in the present embodiment, is configured to operate during both energy storage and power generation processes. During energy storage, the separation subsystem 104 is operable to separate carbon dioxide from ambient air prior to the liquefaction process, thereby producing a substantially carbon dioxide-free input stream to the energy storage subsystem 102. During power generation, the separation subsystem 104 is operable to separate carbon dioxide from the exhaust produced by the power generation system 103 prior to emission to atmosphere, thereby producing a substantially carbon dioxide-free exhaust stream.

Depending upon the implementation, the various subsystems may be closely coupled, for example being co-located or integrated, or alternatively they may be remote from one another, with working fluids distributed by pipeline or other forms of transport. For example, the air liquefied during energy storage may be provided to a different process, and the stored air used during power generation may be sourced from a different energy storage plant. Those skilled in the art will appreciate that the principles disclosed herein apply to any such variation.

FIG. 2

Figure 2:
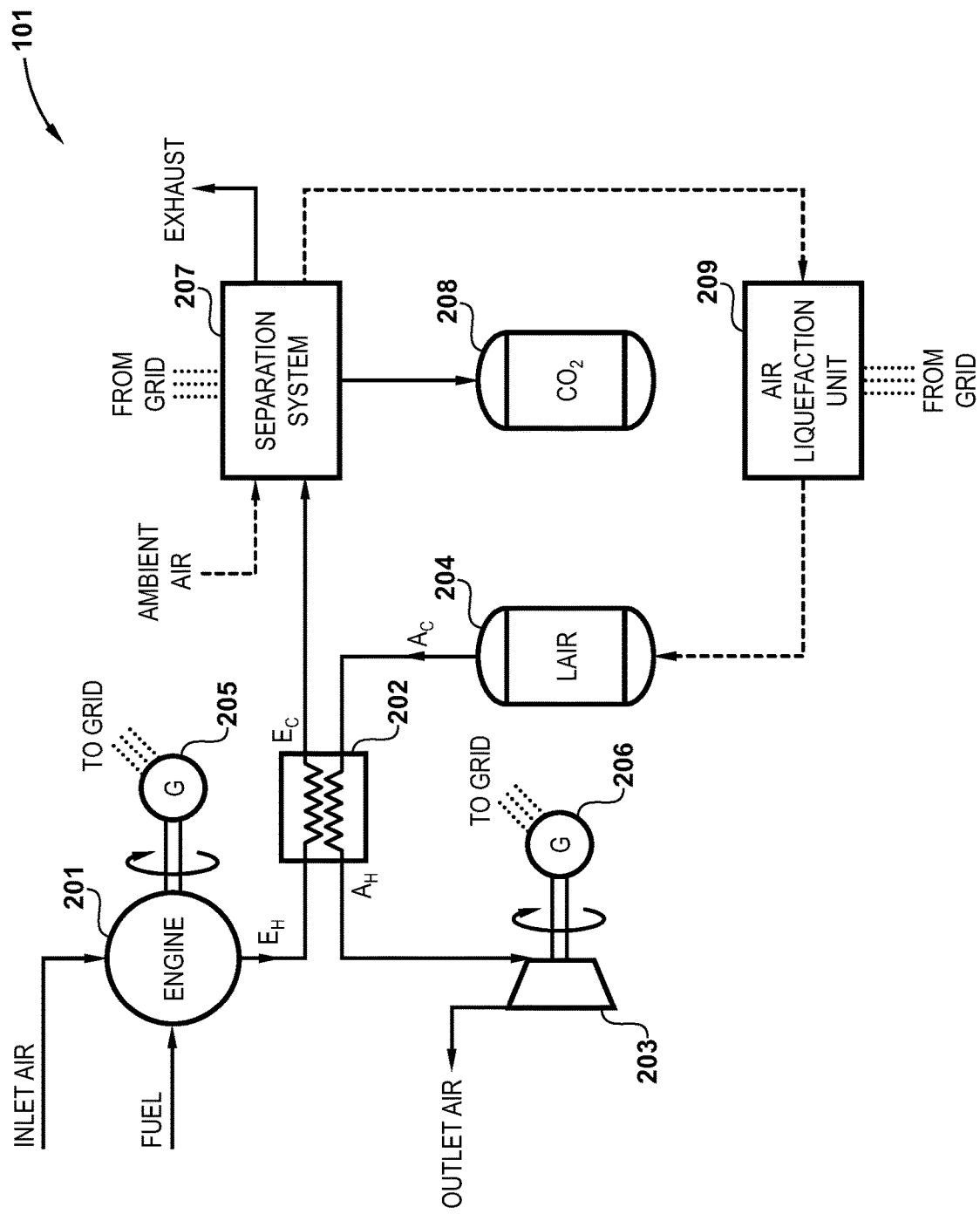
FIG. 2 shows an embodiment of the power generation and storage system of FIG. 1.

An exemplary configuration of the power generation and storage system 101 is shown in FIG. 2.

As described previously, in the present embodiment the power generation subsystem 103 is a combined cycle power generation system, producing power by a combination of combustion and power recovery from air stored in a liquid state. Hence, a combustion engine 201 is provided for production of power by combustion of a carbon-based fuel, and a heat recovery system 202 coupled with an air expansion machine 203 are provided for power recovery.

In the present embodiment, the combustion engine 201 is a gas turbine engine. In a specific embodiment, the combustion engine 201 is an open cycle gas turbine engine. A specific embodiment of the combustion engine 201 will be described further with reference to FIG. 6.

Alternatively, the combustion engine 201 could be a combined cycle gas turbine engine using a steam cycle for further energy recovery. In another embodiment, combustion engine 201 may be a reciprocating engine, for example a spark-ignition or compression-ignition piston engine, etc. It will be appreciated that any other kind of combustion engine may be used, and it is contemplated that the principles of the present invention may be employed with other types of energy conversion apparatus, for example fuel cells configured to internally reform carbon-based fuels, in particular solid-oxide fuel cells, and hence the term combustion engine shall be understood to embrace those devices.

In operation, the combustion engine 201 produces power by combustion of a carbon-based fuel, for example natural gas, gasoline, methanol, etc. in the presence of air. The combustion engine 201 therefore also produces an exhaust stream $E_H$ containing carbon dioxide, water, and other products of combustion. It will be appreciated that this exhaust stream $E_H$ will retain significant enthalpy.

In the present embodiment the power generation and storage system 101 further comprises a liquid air storage system having a liquid air tank 204 for storing air in a liquid state (often referred to as "lair" by those skilled in the art).

During power generation operations, air $A_C$ is pumped from the liquid air tank 204 to commence power recovery. The air $A_C$ is directed to the heat recovery system 202 which is operable to exchange heat from the exhaust stream $E_H$ to the air $A_C$, producing a stream of heated, gaseous air $A_H$ and a cooled exhaust stream $E_C$. The stream of heated air $A_H$ is then expanded in the air expansion machine 203 to recover power therefrom. The expanded air $A_E$ is then exhausted as outlet air. In the present embodiment, the outlet air is exhausted to atmosphere. In a specific embodiment, the air expansion machine 203 is configured to expand the stream of heated air $A_H$ down to atmospheric pressure or very near to it. In an alternative embodiment, the air expansion machine 203 may expand the stream of heated air $A_H$ down to a pressure greater that atmospheric. In such a case, a silencer system may be provided to reduce noise during operation.

In a specific embodiment, a plurality of stages of heat recovery and air expansion are performed. Such a configuration of the power recovery system will be described further with reference to FIG. 3.

In the present embodiment, the power produced by the combustion engine 201 is shaft power. In the present embodiment, the shaft power is used to drive a first electrical generator 205 to produce electrical power.

Similarly, the power produced by the air expansion machine 203 is shaft power. In the present embodiment, the shaft power is used to drive a second electrical generator 206 to produce additional electrical power.

In the illustrated embodiment, the first electrical generator 205 and the second electrical generator 206 are coupled to an electrical grid. Hence, during operation of the combustion engine 201, power may be exported to the electrical grid. In the present embodiment, the electrical grid is a wide area synchronous grid. In this way, the power generation system may be operated as a peaking plant during periods of high demand, for example. Alternatively, the electrical grid may be a microgrid, such as those used for local power generation, or any other kind of electrical grid. Alternatively, the electrical generators 205, 206 may be coupled to different electrical loads.

In other embodiments, the combustion engine 201 and air expansion machine 203 may be coupled to different types of loads. For example, it is envisaged that the power generation and storage system 101 could be used to drive propeller loads in a ship installation. Alternatively, the power generation and storage system 101 could be used to drive industrial rotary machines such as pumps or compressors, for example in a pipeline compressor station.

In the present embodiment, a separation system 207 is also provided to remove carbon dioxide from an input gas stream. During power generation, the input gas stream is the cooled exhaust stream $E_C$, from which carbon dioxide is separated and then stored in a carbon dioxide storage system 208. The separation system 207 will be described further with reference to FIGS. 4 and 5.

In the specific embodiment of FIG. 2, an air liquefaction unit 209 is also provided for liquefying air during an energy storage process. Hence, during energy storage, the input gas stream for the separation system 207 is ambient air. Carbon dioxide may hence therefore also be removed from ambient air prior to liquefaction and also stored in the carbon dioxide storage system 208.

In this embodiment, the liquid air storage system is a liquid air energy storage system and hence further comprises an air liquefaction unit 209 coupled to the liquid air tank 204. The air liquefaction unit 209 comprises refrigeration apparatus to liquefy substantially carbon dioxide-free air received from the separation system 207. The air liquefaction unit 209 operates to liquefy the air using excess power, with the liquefied air being stored in the liquid air tank 204. In the present embodiment, the excess power is excess electrical power. In a specific embodiment the excess electrical power may be sourced from an electrical grid, for example a wide area synchronous grid or microgrid. The grid may be the same grid as the electrical generators 205, 206 are connected to, or it may be different with the power generation and storage system 101 providing a link between different grids. Alternatively, the excess power may be obtained from another source of electricity, such as co-located plant, for example wind turbines or a solar installation. The excess power may alternatively be mechanical power from a rotary machine directly driving the refrigeration apparatus, for example.

FIG. 3

Figure 3:
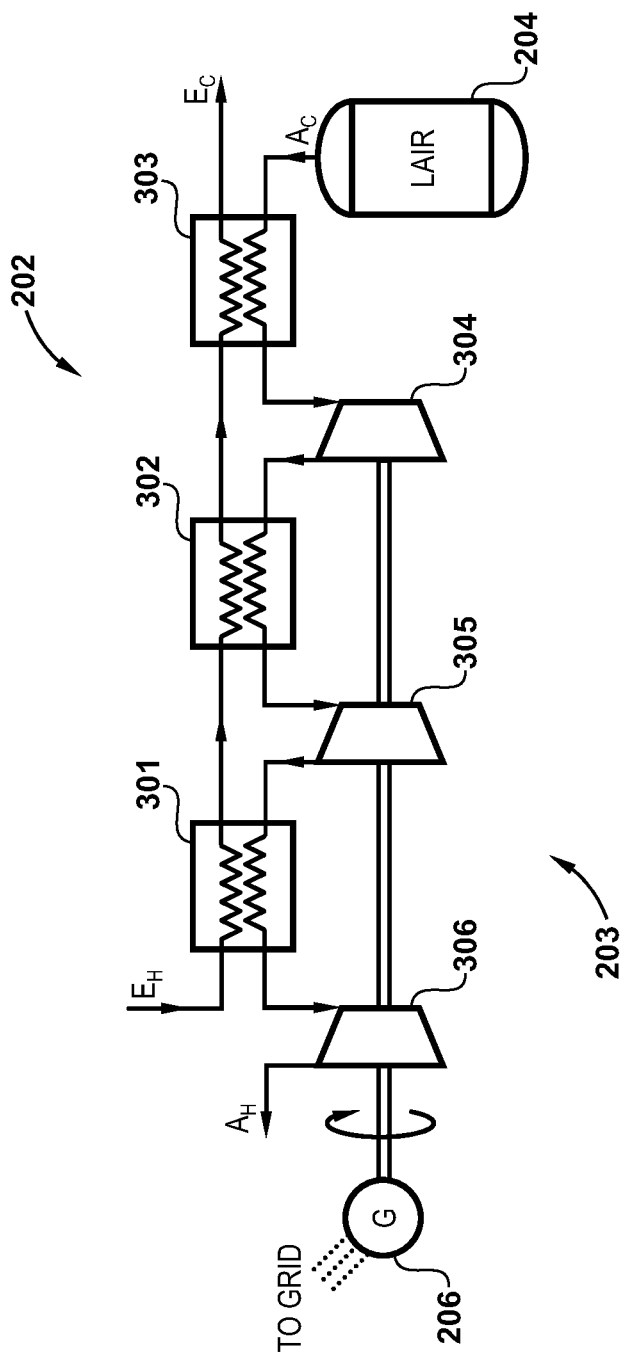
FIG. 3 shows an embodiment of the power recovery apparatus of FIG. 2.

An embodiment of the power recovery apparatus is shown in FIG. 3, comprising a plurality of stages of heat recovery and expansion to maximise the efficiency of the power recovery from the exhaust of the combustion engine by the air expansion machine.

In this example, the heat recovery system 202 comprises three heat exchangers arranged in fluid flow series: a first heat exchanger 301; a second heat exchanger 302; and a third heat exchanger 303. A hot-side pass of each heat exchanger 301-303 carries exhaust gas produced by the combustion engine 201 during power generation. A cold-side pass of each heat exchanger 301-303 carries air from the liquid air tank 204. Heat exchange between the hot- and cold-side passes cools the exhaust stream and heats the air.

In order to recover power from the air as it is heated, the air expansion machine 203 comprises three expansion stages: a first expansion stage 304 between the third heat exchanger 303 and the second heat exchanger 302; a second expansion stage 305 between the second heat exchanger 302 and the first heat exchanger 301; and a third expansion stage 306 between the first heat exchanger 301 and atmosphere.

In this specific embodiment, the expansion stages 304-306 are mounted to the same shaft and drive the second electrical generator 206. Alternatively, each expansion stage could be mounted to a respective independent load. It will be appreciated that any other suitable drive system could be used. Further, it will be appreciated that more or indeed fewer stages of heat exchange and/or expansion could be provided depending upon the implementation.

Recognising the extremely low temperature of the air as it is pumped from the liquid air tank 204, in an embodiment, the heat recovery system 202 may include additional heat exchangers for rejecting heat into the air as it undergoes its change of phase from liquid to gas, for example coolers for the combustion engine 201 or the separation system 207. Such an example will be described with reference to FIGS. 4, 5 and 6.

FIG. 4

Figure 4:
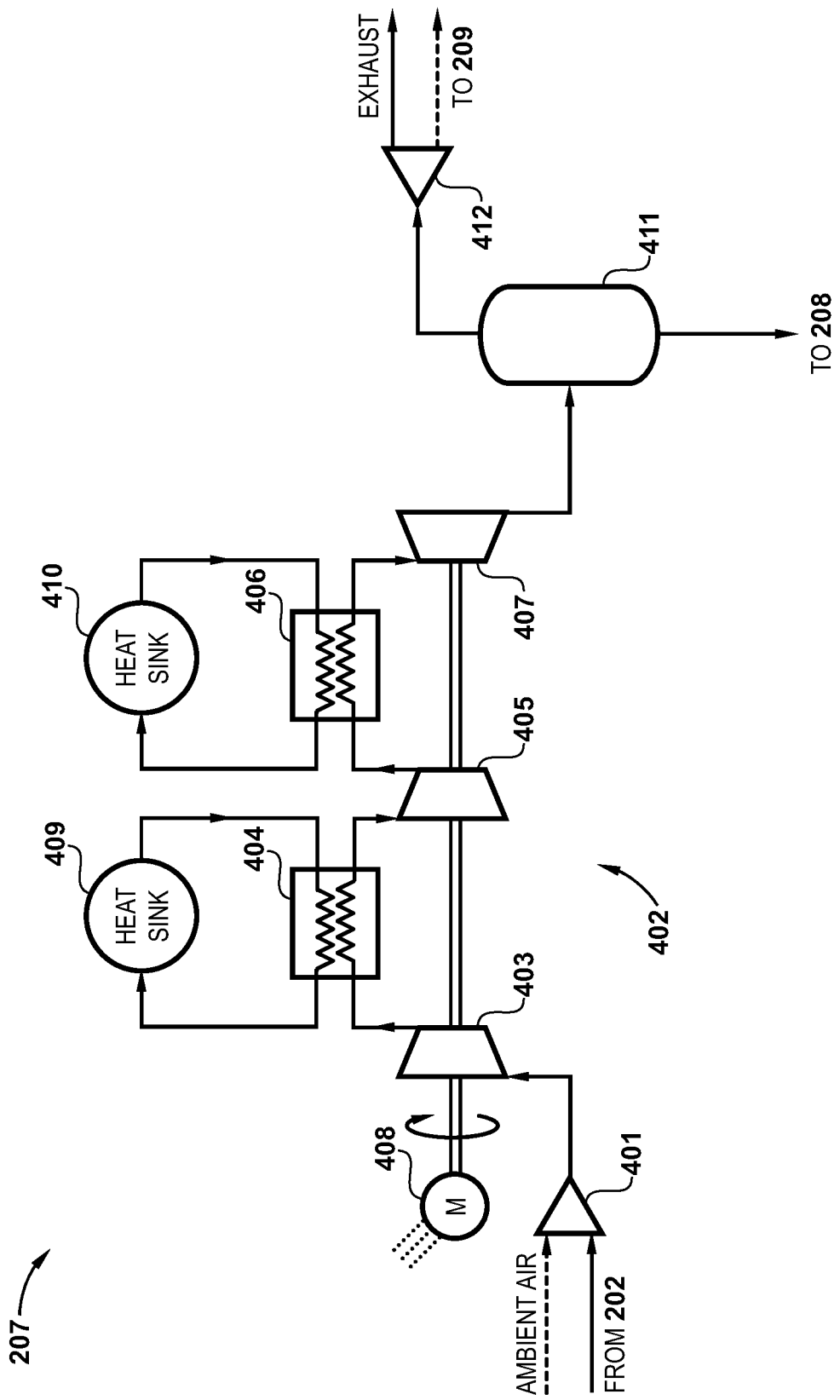
FIG. 4 shows an embodiment of the separation system of FIG. 2.

An embodiment of the separation system 207 is shown in greater detail in FIG. 4, which utilises a reverse Brayton cycle concept to reduce the temperature of the input gas stream to liquefy the carbon dioxide therein.

In the present embodiment, the separation system 207 comprises an input selector 401 to select either the cooled exhaust stream from the heat recovery system 202 during power generation, or ambient air during energy storage. In the present embodiment the input selector 401 is a valve, and in a specific embodiment a three-way valve in which opening of one inlet closes the other to prevent the exhaust stream from exiting via the ambient air inlet. It will be appreciated that any other suitable valve system could be used, for example a plurality of valves controlled in concert.

Whatever the input gas stream, in the present embodiment it is directed as working fluid to a reverse Brayton cycle cooler 402, which comprises, in fluid flow series, a low-pressure compressor 403, an intercooler 404, a high-pressure compressor 405, a main cooler 406, and an expander 407. The compressors 403, 405 and the expander 407 are mounted to a common shaft and augmented by an electric motor 408. The motor 408 may receive electrical power from the same source as the air liquefaction unit 209 during energy storage, and possibly from either of the electrical generators 205, 206 during power generation, for example. Any other suitable drive system may be used, for example the low-pressure compressor 403 may be mounted on a separate spool and independently driven.

It will also be appreciated that the compression side of the reverse Brayton cycle cooler 402 could adopt any suitable configuration. In the present embodiment, the reverse Brayton cycle cooler 402 comprises a multistage compressor arrangement—specifically a two-stage compressor, with the low- and high-pressure compressors 403, 405 each being single stage. More stages could be provided, for example three or four compressor stages. Further, one or more of the low- and high-pressure compressors 403, 405 could comprise multiple compression stages. In either case, a greater number of intercoolers could be provided. Similarly, the expander 407 could be a single- or multi-stage expander.

In alternative embodiments, the compression side of the reverse Brayton cycle cooler 402 may not be intercooled. Optionally, it may also permit the use of a single-stage compressor.

After initial compression in the low-pressure compressor 403, the input gas stream flows through a hot-side pass of the intercooler 404. The cold-side pass of the intercooler 404 forms part of a cooling circuit comprising a first heatsink 409.

After being cooled in the intercooler 404, the input gas stream is compressed further in the high-pressure compressor 405, and then flows through a hot-side pass of the main cooler 406. The cold-side pass of the main cooler 406 forms part of a cooling circuit comprising a second heatsink 410.

In an embodiment, the first heatsink 409 and second heatsink 410 are reservoirs of cooling water pumped around the respective cooling circuits. It will be appreciated that any other suitable heatsink could be used. For example, during power generation, air from the liquid air tank 204 may be used for cooling the exhaust gas stream as it passes through the intercooler 404 and main cooler 406.

Following cooling in the main cooler 406, the input gas stream is expanded in the expander 407. This produces a fluid stream with a significantly reduced temperature. In the present embodiment, the outlet conditions are selected such that the fluid stream pressure and temperature remain above the triple point of carbon dioxide to prevent deposition from the gas phase directly into the solid phase, hence the carbon dioxide may remain liquid.

It will be appreciated that the temperature drop across the expander 407 may cause water to condense. Thus, in a specific embodiment water removal apparatus such as a condenser may be provided at a suitable location, for example between the main cooler 406 and the expander 407, or prior to the reverse Brayton cycle cooler 402. Alternatively, the expander may comprise a heating device to prevent condensation forming on the blades and guide vanes therein.

The fluid stream from the expander 407 is then directed to a separation unit 411. In the present embodiment, the separation unit 411 is a flash separation unit (also known as a flash drum or vapor-liquid separator). Hence, in this embodiment, upon entry into the flash separation unit, liquid carbon dioxide settles to the bottom of the vessel under gravity, whereupon it may be withdrawn and stored in the carbon dioxide storage system 208. The remaining constituents of the fluid stream are withdrawn from the top of the vessel as a carbon dioxide-free gas stream, which is directed to an outlet selector 412. The outlet selector 412 operates on a similar basis to the inlet selector 401, and hence either directs the carbon-dioxide free gas stream (ambient air prior to the separation process) to the air liquefaction unit 209 during energy storage, or the carbon-dioxide free gas stream (combustion engine exhaust prior to the separation process) to atmosphere during power generation.

In an embodiment, a second expander may be stationed between the separation unit 411 and the outlet selector 412. Such a second expander may be drivingly connected with the expander 407 and the compressors 403, 405. During power generation, this second expander may recover further power from the exhaust stream and assist in reducing the noise of otherwise high-pressure exhaust flow as it is vented to atmosphere. During energy storage, this second expander would recover further power and in doing so would further reduce the temperature of fluid stream provided to the air liquefaction unit 209.

FIG. 5

Figure 5:
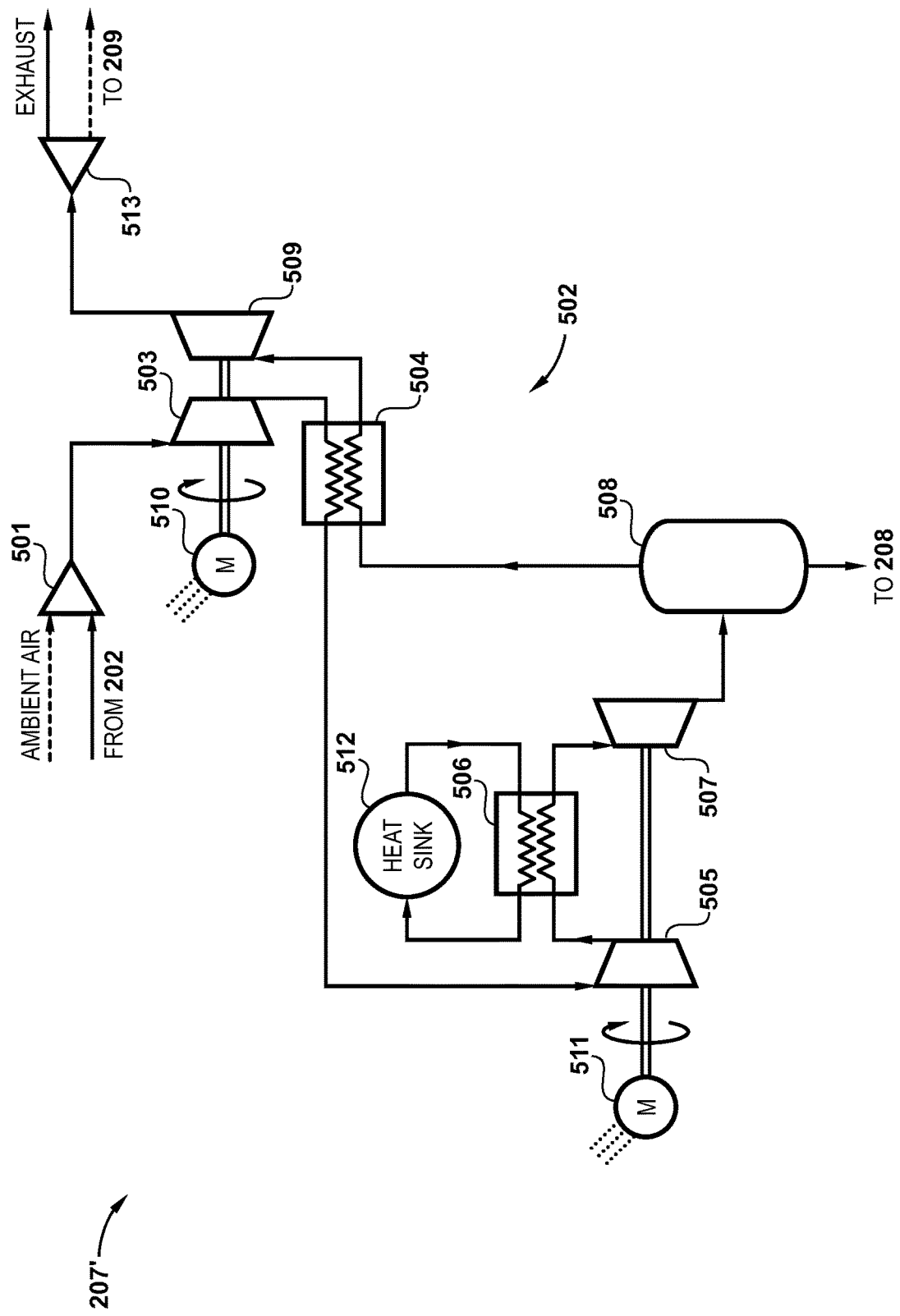
FIG. 5 shows another embodiment of the separation system of FIG. 2.

An alternative embodiment of the separation system 207' is shown in FIG. 5. As with the embodiment of FIG. 4, it utilises a reverse Brayton cycle concept to reduce the temperature of the input gas stream to liquefy the carbon dioxide therein.

In the present embodiment, the separation system 207' comprises an input gas stream selector 501 having the same configuration as the input gas stream selector 401. The input gas stream selected by the input gas stream selector 501 is directed as working fluid to a twin-spool reverse Brayton cycle cooler 502 which comprises, in fluid flow series, a low-pressure compressor 503, the hot-side pass of an intercooler 504, a high-pressure compressor 505, a main cooler 506, a high-pressure expander 507, a separation unit 508, the cold-side pass of the intercooler 504, and a low-pressure expander 509.

In the present embodiment, each compressor is a single stage compressor, but in another embodiment one or more of the compressors could be a multi-stage compressor. Similarly, in the present embodiment, each expander is a single stage expander, but in another embodiment one or more of the expanders could be a multi-stage expander.

In this embodiment, the low-pressure compressor 503 and low-pressure expander 509 form a separate low-pressure spool driven by a first electric motor 510, whilst the high-pressure compressor 505 and the high-pressure expander 507 form a separate high-pressure spool driven by a second electric motor 511. Each motor 510, 511 may receive electrical power from the same source as the air liquefaction unit 209 during energy storage, and possibly from either of the electrical generators 205, 206 during power generation, for example. Any other suitable drive system may be used, for example spools could be connected directly or via a gear system.

During operation of the separation system 207' working fluid is initially compressed in the low-pressure compressor 503. It is then cooled in the intercooler 504, and subsequently further compressed in the high-pressure compressor 505. The highly compressed fluid then flows through a hot-side pass of the main cooler 506. The cold-side pass of the main cooler 506 forms part of a cooling circuit comprising a heatsink 512.

In an embodiment, the heatsink 512 is a cooling water reservoir, with the cooling water being pumped around the cooling circuit. It will be appreciated that any other suitable heatsink could be used. For example, during power generation, air from the liquid air tank 204 may be used for cooling the exhaust gas stream as it passes through the main cooler 506.

After being cooled in the main cooler 506, the cooled fluid passes through the expander 507 which is of similar configuration to expander 407. The fluid stream from the expander 507 is then directed to the separation unit 508. As with the separation unit 411, in the present embodiment, the separation unit 508 is a flash separation unit (also known as a flash drum). Thus, liquid carbon dioxide may be withdrawn from the flash separation unit and stored in the carbon dioxide storage system 208. The carbon dioxide-free fluid withdrawn from the top of the flash separation unit is still at a very low temperature. Thus, in this embodiment it is directed through the cold-side pass of the intercooler 504, and hence forms the heatsink for working fluid in the hot-side pass of the intercooler 504 following its initial compression in the low-pressure compressor 503.

Following heating in the cold-side pass of the intercooler 504, a final expansion of the carbon-dioxide free fluid is performed in the low-pressure expander 509 prior to output via an outlet selector 513. The outlet selector 513 operates on a similar basis to the outlet selector 412, and hence either directs the carbon-dioxide free gas stream (ambient air prior to the separation process) to the air liquefaction unit 209 during energy storage, or the carbon-dioxide free gas stream (combustion engine exhaust prior to the separation process) to atmosphere during power generation.

Analysis has shown that the arrangement of separation system 207' may achieve up to twice the efficiency of the embodiment of FIG. 4. This is due to the heat exchange process in the intercooler, which not only improves the efficiency of the compression process but also increases the enthalpy of the working fluid on the hot-side pass prior to expansion in the low-pressure expander 509, increasing energy recovery.

FIG. 6

Figure 6:
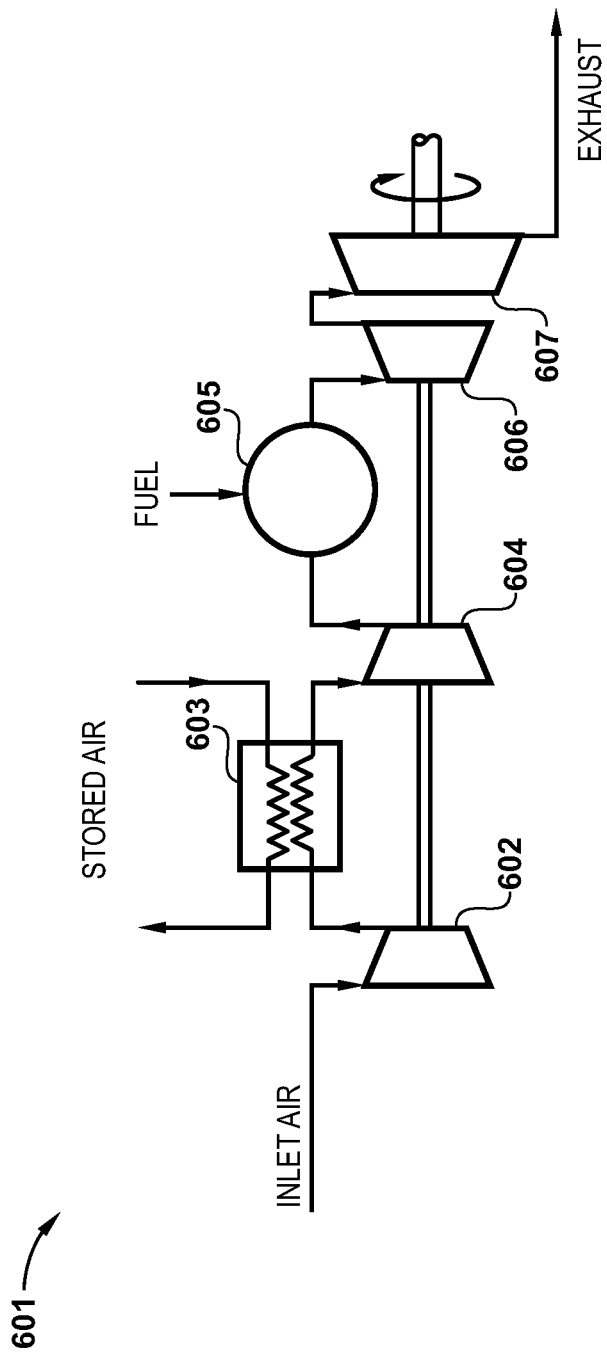
FIG. 6 shows an embodiment of the combustion engine of FIG. 2.

An embodiment of the combustion engine 201 is shown in FIG. 6. In this embodiment, the combustion engine 201 has an intercooled compression system configured to reject heat into air in the heat recovery system 202.

In the specific embodiment of FIG. 6, the combustion engine 201 is gas turbine engine 601 comprising, in fluid flow series, a low-pressure compressor 602 for compressing inlet air, an intercooler 603, a high-pressure compressor 604, a combustor 605 for receiving fuel and compressed air for combustion therein, a turbine 606 configured to expand the products of combustion and thereby drive the compressors 602, 604, and a free power turbine 607 for driving a load, such as the first electrical generator 205. Exhaust from the free power turbine 607 continues to the heat recovery system 202. Any other turbine arrangement could be adopted, for example a single-spool engine with a single turbine and no free power turbine could be used.

Following initial compression in the low-pressure compressor 602, air is directed to the hot-side pass of the intercooler 603 where it is cooled prior to further compression in the high-pressure compressor 604. In the present embodiment, the intercooler 603 is an air-to-air intercooler and forms part of the heat recovery system 202. Stored air from the liquid air tank 204 flows through the cold-side pass of the intercooler 603 such that the heat of compression is rejected into air in the heat recovery system 202.

The use of an intercooler reduces the air delivery temperature from the high-pressure compressor 604 into the combustor 605. Hence, more complete consumption of the totality of oxygen in the air delivered to the combustor 605 is possible, whilst remaining within the temperature limit of the turbine 606. This results in more carbon dioxide being produced per unit of combustor 605 inlet air mass-flow, and hence a synergistically more efficient separation process in the separation system 207 due to the greater carbon dioxide concentration.

It will be appreciated that the location of the intercooler in the heat recovery system may be chosen in dependence upon the temperatures at the various points in the specific implementation, for example the cold-side pass of the intercooler 603 could be located between the third heat exchanger 303 and the first expander 304, or between the third expander 306 and atmosphere, or any other suitable configuration.

In alternative embodiments, the gas turbine 601 may adopt a sequential combustion architecture, with an additional combustor added downstream of the turbine 606, for example. In this way, further fuel may be burned, consuming additional oxygen and producing an exhaust with a greater concentration of carbon dioxide per unit work output. As with the intercooled embodiment described herein, this may result in an overall more efficient separation process in the separation system 207.

In other alternative embodiments, the combustion engine 201 may be a reciprocating engine. In such circumstances, the intercooled compression system may comprise a crank-driven compressor or turbine-drive compressor followed by the intercooler for cooling the charge air prior to admission into the cylinder(s).

Various examples have been described, each of which comprise various combinations of features. It will be appreciated by those skilled in the art that, except where clearly mutually exclusive, any of the features may be employed separately or in combination with any other features and the invention extends to and includes all combinations and sub-combinations of one or more features described herein.

The invention claimed is:

1. A combined cycle power generation and storage system comprising:
a liquid air energy storage system configured to use power to liquefy air and store it in a liquid state;
a combustion engine configured to produce power by combustion of a carbon-based fuel along with an exhaust stream containing carbon dioxide;
a heat recovery system configured to exchange heat from the exhaust stream to air from the liquid air storage system, and thereby produce a cooled exhaust stream and heated air;
an air expansion machine configured to recover power by expansion of heated air from the heat recovery system; and
a separation system configured to separate carbon dioxide from ambient air prior to liquefaction during operation of the liquid air energy storage system, and to separate carbon dioxide from the cooled exhaust stream during operation of the combustion engine prior to emission of the cooled exhaust stream to atmosphere, wherein the separation system comprises:
a reverse Brayton cycle cooler configured to further cool the cooled exhaust stream or ambient air to liquefy carbon dioxide therein, and to thereby produce a further-cooled gas stream; and
a separation unit configured to separate carbon dioxide entrained in the further-cooled gas stream, and thereby produce an output gas stream having a reduced concentration of carbon dioxide.

2. The system of claim 1, further comprising:
a first electrical generator coupled to the combustion engine to produce electrical power; and
a second electrical generator coupled to the air expansion machine to produce electrical power.

3. The system of claim 2, wherein one or more of the first electrical generator and the second electrical generator is coupled to an electrical grid.

4. The system of claim 1, wherein the power is electrical power from an electrical grid.

5. The system of claim 1, wherein the air expansion machine is configured to expand the heated air and exhaust it to atmosphere.

6. The system of claim 1, in which the separation unit is a flash separation unit.

7. The system of claim 1, wherein the reverse Brayton cycle cooler comprises, in fluid-flow series:
a compressor configured to compress a working fluid;
a heat exchanger configured to reject heat from the working fluid to a heatsink; and
an expander configured to expand, and thereby further cool, the working fluid.

8. The system of claim 7, wherein the compressor is a multi-stage compressor.

9. The system of claim 8, wherein the reverse Brayton cycle cooler further comprises an intercooler between stages of the multi-stage compressor, the intercooler being configured to reject heat from the working fluid to a heatsink.

10. The system of claim 9, wherein the heatsink of the intercooler is an output exhaust stream from the separation unit.

11. The system of claim 9, wherein the intercooler forms part of the heat recovery system, and the heatsink of the intercooler is air from the liquid air storage system.

12. The system of claim 9, further comprising a second expander configured to expand an output exhaust stream of the separation unit.

13. The system of claim 1, wherein the combustion engine comprises an intercooled compression system configured to reject heat to air in the heat recovery system.

14. The system of claim 1, wherein the combustion engine comprises one of:
 a gas turbine engine; and
 a reciprocating engine.

15. A method of operating a combined cycle power generation and storage system the method comprising:
 storing power using a liquid air energy storage system by separating carbon dioxide from ambient air, liquefying the air, and storing the air in a liquid state;
 producing power by combustion of a carbon-based fuel in a combustion engine, along with an exhaust stream containing carbon dioxide;
 exchanging heat from the exhaust stream to air from the liquid air storage system, thereby producing a cooled exhaust stream and heated air;
 recovering power by expansion of the heated air; and
 separating carbon dioxide from the cooled exhaust stream; wherein
 carbon dioxide is separated from the air and from the cooled exhaust stream using the same separation system, and
 the carbon dioxide is separated by cooling the cooled exhaust stream or ambient air using a reverse Brayton cycle.

16. The method of claim 15, wherein:
 the power is received from an electrical grid; and
 the power produced by combustion of carbon-based fuel is exported to the electrical grid.

17. The method of claim 15, wherein the reverse Brayton cycle performs, in sequence, compression, heat rejection, and expansion processes upon the cooled exhaust or ambient air.

18. The method of claim 15, wherein the reverse Brayton cycle expands the cooled exhaust stream or the ambient air to a pressure and temperature above the triple point of carbon dioxide such that said carbon dioxide remains in a liquid state.

19. A combined cycle power generation and storage system comprising:
 a liquid air energy storage system configured to use power to liquefy air and store it in a liquid state;
 a combustion engine configured to produce power by combustion of a carbon-based fuel along with an exhaust stream containing carbon dioxide;
 a heat recovery system configured to exchange heat from the exhaust stream to air from the liquid air storage system, and thereby produce a cooled exhaust stream and heated air;
 an air expansion machine configured to recover power by expansion of heated air from the heat recovery system; and
 a separation system configured to separate carbon dioxide from ambient air prior to liquefaction during operation of the liquid air energy storage system, and to separate carbon dioxide from the cooled exhaust stream during operation of the combustion engine prior to emission of the cooled exhaust stream to atmosphere, wherein
 the combustion engine comprises an intercooled compression system configured to reject heat to air in the heat recovery system.

* * * * *